May 20, 1930.  J. W. WATSON  1,759,722
MULTIPLE LEAF SPRING
Filed May 26, 1928
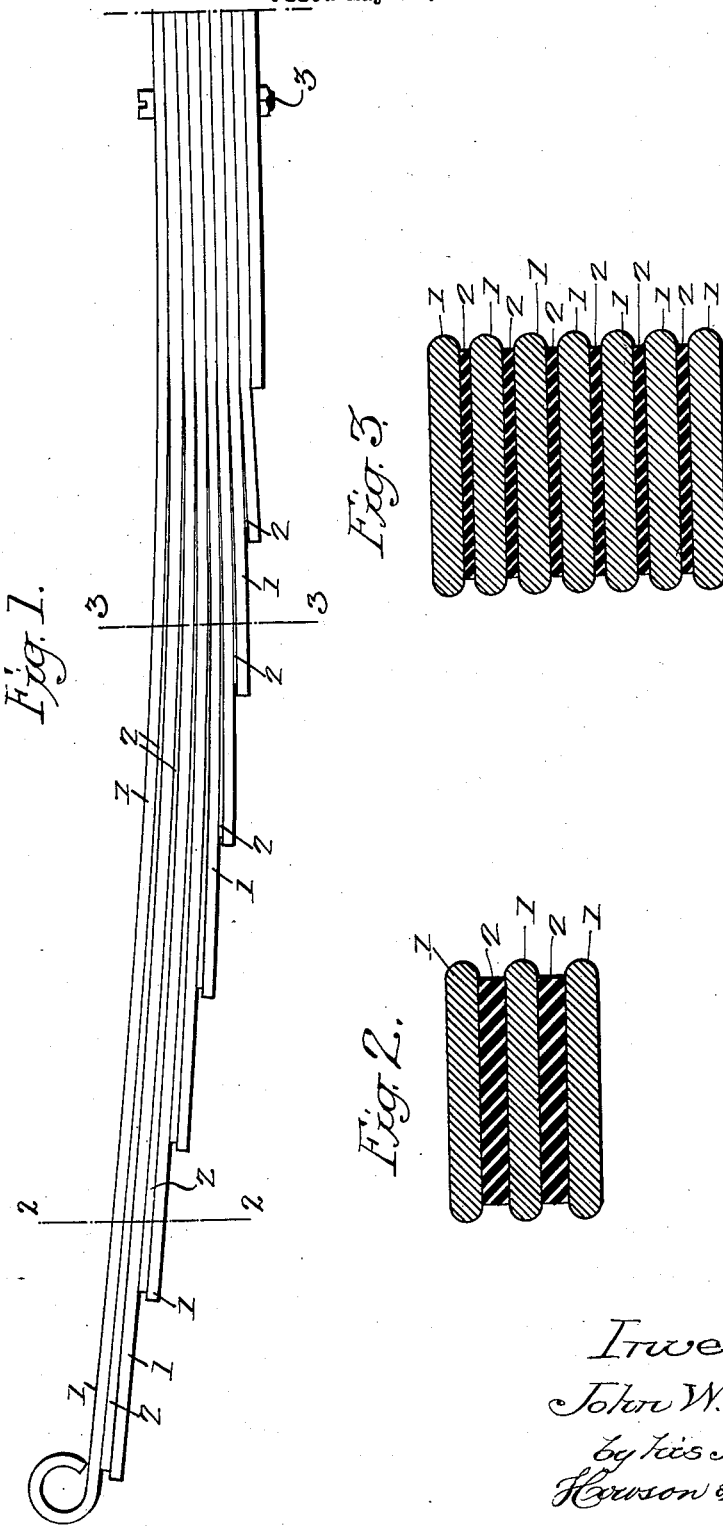
Inventor:—
John W. Watson,
by his Attorneys,
Howson & Howson.

Patented May 20, 1930

1,759,722

UNITED STATES PATENT OFFICE

JOHN WARREN WATSON, OF WAYNE, PENNSYLVANIA

MULTIPLE-LEAF SPRING

Application filed May 26, 1928. Serial No. 280,785.

This invention relates to a new construction for multiple-leaf springs and in particular for multiple-leaf springs for supporting the bodies of motor cars, railway cars and other vehicles.

A particular object of the invention is to eliminate sliding friction between the leaves of the spring in order that relative movement of the leaves may be more easily accomplished and hence render the spring, as a whole, more readily yieldable to impact, particularly when the impact is light; it being well understood that when contending with sliding friction, and particularly when the friction surfaces are not lubricated or are inadequately lubricated, the static or starting friction is especially stubborn and cannot be broken by light forces. Thus a vehicle spring, embodying interleaf sliding friction, has no value as an absorber of shocks unless the shocks are relatively heavy—heavy enough to break the interleaf static frictional hold. This makes the ride stiff and jerky when the vehicle is traveling over relatively smooth surfaces where mere undulations and hence forces of light impact are encountered.

A further object is to render unnecessary any need for the polishing of spring leaves.

A further object is to render unnecessary any need for interleaf lubrication and hence any attempt at adequate lubrication.

A further object is to render unnecessary the use of spring boots or other means to keep lubricants in or mud and water out.

Another object is to prevent any possibility of spring leaf gouging, scoring, or squeaking.

To accomplish all of the above purposes and other advantages I use, in the present embodiment of my invention, strips of rubber material placed between the leaves and which are of such composition and dimensions that the strips will firmly adhere to the surfaces of the adjacent leaves and will permit relative movement between the leaves by the strips themselves stretching or flowing molecularly. Thus, without rubbing or sliding friction whatsoever, the leaves are permitted to support one another and are permitted relative movement with one another.

I preferably employ strips of tapered form having their thicker section adjacent the ends of the leaves and their thinner section adjacent the center of the leaves. This places the most material where there is the greatest interleaf movement and, all along the line, makes proportional the amount of material with the amount of movement. Also, adjacent the center of the spring, where there is practically no interleaf movement, I prefer to provide none of the material in order that the leaves of the spring may be more securely held together and the spring, as a whole, more securely anchored in position.

The composition and dimensions of the strips should be such that the material will stretch or flow molecularly more readily than it will slide on the leaves. This will call for various compositions and dimensions to suit different designs of springs, spring loadings and amounts of relative interleaf movements.

As already set forth, this invention makes unnecessary any polishing of the leaves for smooth action and manufacturing expense may be reduced as roughness of leaf surface now becomes an advantage as it will insure more certain relative adhesion between the leaf surfaces and the elastic, rubber-like material of which the strips are made. The strips may be cemented or otherwise secured to one or both of the adjacent leaves if desired. Also if desired, the leaves may be provided with high points or depressions, or both, in order to provide a still more certain gripping of the strips.

In addition to the yielding and cushioning value given to the spring by the elimination of interleaf friction, it will be seen that this novel construction gives further cushioning value by providing that no shocks can pass through the spring leaves without also passing through and hence receiving the cushioning value of the plurality of strips of the softer material.

In the accompanying drawings:

Figure 1 is a longitudinal side elevation of a half portion of a conventional vehicle spring equipped with my novel interleaf strips;

Fig. 2 is a cross section on line 2—2 in Fig. 1; and

Fig. 3 is a cross section on line 3—3 in Fig. 1.

In all drawings, like numbers refer to like parts. 1 indicates the spring leaves; 2 the novel interleaf strips; and 3 the conventional center bolt.

I claim:

1. In a spring, the combination of a plurality of superimposed metal leaves and means for clamping said leaves together, and a rubber leaf so positioned between adjacent ones of said metal leaves as to separate and support them for the greater portion of their superimposed length between their clamped section and an extremity of one of said leaves, but not so positioned as to interfere with said metal leaves being brought into direct contact at the section where they are clamped together.

2. In a spring, the combination of a plurality of superimposed metal leaves of different lengths, and means for holding said leaves together, and a plurality of rubber members positioned respectively between opposed surfaces of adjacent leaves, each of said rubber members extending from adjacent the end of one of said leaves towards said holding means to a point past the end of the next shorter leaf but not so far towards said holding means as to interfere with said leaves being brought into direct contact at the section where they are held together.

3. In a spring, the combination of a plurality of superimposed metal leaves of different lengths, and means for holding said leaves together, and a plurality of rubber members positioned respectively between opposed surfaces of adjacent leaves, each of said rubber members extending from adjacent the end of one of said leaves towards said holding means to a point past the end of the next shorter leaf but not so far towards said holding means as to interfere with said leaves being brought into direct contact at the section where they are held together, one of said rubber members contacting a relatively long leaf being thicker than another of said rubber members contacting a leaf of lesser length.

4. In a spring, the combination of a plurality of superimposed metal leaves of different lengths, and means for holding said leaves together, and a plurality of rubber members positioned respectively between opposed surfaces of adjacent leaves, each of said rubber members being tapered and extending from adjacent the end of one of said leaves towards said holding means to a point past the end of the next shorter leaf but stopping short of said holding means to permit the said leaves being brought into direct contact at the section where they are held together.

5. In a spring, the combination of a plurality of superimposed metal leaves of different lengths, and means for holding said leaves together, and a plurality of rubber members positioned respectively between opposed surfaces of adjacent leaves, each of said rubber members being tapered and extending from adjacent the end of one of said leaves towards said holding means to a point past the end of the next shorter leaf but stopping short of said holding means to permit the said leaves being brought into direct contact at the section where they are held together, at least one of said rubber members contacting a relatively long leaf being thicker than another of said rubber members contacting a leaf of lesser length.

6. In a spring, the combination of a plurality of superimposed metal leaves of different lengths, and means for holding said leaves together, and a plurality of pre-molded rubber members positioned respectively between opposed surfaces of adjacent leaves, each of said rubber members extending from adjacent the end of one of said leaves towards said holding means to a point past the end of the next shorter leaf but not so far towards said holding means as to interfere with said leaves being brought into direct contact at the section where they are held together, one of said rubber members contacting a relatively long leaf being thicker than another of said rubber members contacting a leaf of lesser length.

JOHN WARREN WATSON.